United States Patent
Eastwood et al.

(10) Patent No.: US 10,753,222 B2
(45) Date of Patent: Aug. 25, 2020

(54) GAS TURBINE ENGINE BLADE OUTER AIR SEAL

(71) Applicant: United Technologies Corporation, Farmington, CT (US)

(72) Inventors: Jonathan Jeffery Eastwood, West Hartford, CT (US); Joseph F. Englehart, Gastonia, NC (US); Christopher Carter Venable, West Palm Beach, FL (US); Michael G. McCaffrey, Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 260 days.

(21) Appl. No.: 15/700,264

(22) Filed: Sep. 11, 2017

(65) Prior Publication Data

US 2019/0078457 A1 Mar. 14, 2019

(51) Int. Cl.
| | | |
|---|---|---|
| *F01D 11/14* | (2006.01) | |
| *F01D 25/24* | (2006.01) | |
| *F16J 15/08* | (2006.01) | |
| *F01D 11/08* | (2006.01) | |
| *F16J 15/16* | (2006.01) | |
| *F01D 11/12* | (2006.01) | |

(52) U.S. Cl.
CPC .............. *F01D 11/14* (2013.01); *F01D 11/08* (2013.01); *F01D 25/246* (2013.01); *F16J 15/0887* (2013.01); *F16J 15/16* (2013.01); *F01D 11/127* (2013.01); *F05D 2240/11* (2013.01); *F05D 2240/307* (2013.01); *F05D 2240/55* (2013.01); *F05D 2250/283* (2013.01); *F05D 2250/75* (2013.01); *F05D 2260/30* (2013.01)

(58) Field of Classification Search
None
See application file for complete search history.

(56) References Cited

U.S. PATENT DOCUMENTS

| | | | | |
|---|---|---|---|---|
| 4,796,423 | A | * 1/1989 | Lievestro | ................. F01D 9/04 403/209 |
| 5,044,881 | A | 9/1991 | Dodd et al. | |
| 5,188,507 | A | 2/1993 | Sweeney | |
| 5,192,185 | A | 3/1993 | Leonard | |
| 5,407,320 | A | 4/1995 | Hutchinson | |
| 5,641,267 | A | * 6/1997 | Proctor | ................... F01D 11/08 415/173.1 |
| 5,738,490 | A | * 4/1998 | Pizzi | .................... F01D 11/005 415/139 |

(Continued)

FOREIGN PATENT DOCUMENTS

EP 0844369 A1 5/1998

OTHER PUBLICATIONS

Partial European Search Report for European Application No. 18193887.9 dated May 8, 2019.

*Primary Examiner* — Kenneth J Hansen
*Assistant Examiner* — Jason A Fountain
(74) *Attorney, Agent, or Firm* — Carlson, Gaskey & Olds, P.C.

(57) ABSTRACT

A gas turbine engine sealing system includes a case including forward and aft hooks. The aft hook arranged radially outward of the forward hook. A blade outer air seal has a J-hook that receives the aft hook and includes an end received by the forward hook.

16 Claims, 3 Drawing Sheets

(56) References Cited

U.S. PATENT DOCUMENTS

| | | | |
|---|---|---|---|
| 6,062,813 A * | 5/2000 | Halliwell | F01D 9/04 415/173.1 |
| 6,120,242 A | 9/2000 | Bonnoitt et al. | |
| 6,341,938 B1 | 1/2002 | Zegarski et al. | |
| 6,918,743 B2 * | 7/2005 | Gekht | F01D 9/04 415/139 |
| 7,217,089 B2 * | 5/2007 | Durocher | F01D 11/005 415/170.1 |
| 7,334,984 B1 | 2/2008 | Stine et al. | |
| 7,941,920 B2 * | 5/2011 | Thompson | F01D 11/08 29/889.2 |
| 9,115,596 B2 * | 8/2015 | Clouse | F01D 25/00 |
| 9,353,649 B2 * | 5/2016 | Rioux | F01D 25/246 |
| 9,512,734 B2 * | 12/2016 | Feldmann | F01D 9/04 |
| 10,138,734 B2 * | 11/2018 | Jaureguiberry | F01D 9/04 |
| 10,233,782 B2 * | 3/2019 | Stafford | F01D 17/167 |
| 2006/0159549 A1 * | 7/2006 | Durocher | F01D 11/005 415/170.1 |
| 2014/0044528 A1 * | 2/2014 | Clouse | F01D 25/00 415/173.1 |
| 2014/0044529 A1 * | 2/2014 | Feldmann | F01D 9/04 415/173.1 |
| 2014/0241874 A1 * | 8/2014 | Rioux | F01D 25/246 415/209.4 |
| 2015/0369409 A1 | 12/2015 | Broomer et al. | |
| 2016/0024926 A1 * | 1/2016 | Jaureguiberry | F01D 9/04 416/182 |
| 2017/0067366 A1 | 3/2017 | Stricker | |

* cited by examiner

GAS TURBINE ENGINE BLADE OUTER AIR SEAL

STATEMENT REGARDING FEDERALLY SPONSORED RESEARCH OR DEVELOPMENT

This invention was made with government support under contract number W911W6-16-2-0012 with the U.S. Army. The government has certain rights in the invention.

BACKGROUND

This disclosure relates to turbomachinery, and more particularly, the disclosure relates to a blade outer air seal for a gas turbine engine.

Gas turbine engines include a compressor that compresses air, a combustor that ignites the compressed air and a turbine across which the compressed air is expanded. The expansion of the combustion products drives the turbine to rotate, which in turn drives rotation of the compressor.

In order to increase efficiency, a clearance between the tips of the blades in the compressor and the outer diameter of the flowpath is kept sufficiently small. This ensures that a minimum amount of air passes between the tips and the outer diameter. Some engines include a blade outer air seal (BOAS) supported by case structure to further reduce tip clearance.

Typical small engine power turbines use a full, circumferentially unbroken ring BOAS to control the amount of air leakage at the tip of the power turbine blades. As the blades rotate and heat up due to engine operation the tips will rub a very small amount against a honeycomb seal.

The nature of the full ring/rotating blade arrangement makes tip clearance, distance between the top of the blade tip and honeycomb, sensitive to temperature. The clearance between the BOAS and the blade tips is sensitive to the temperature of the gas path at different engine conditions. If the continuous, unitary ring heats up at a faster rate than the rotating blades the tip clearance could increase and cause a drop in efficiency. Conversely, if the blades heat up at a faster rate than the BOAS support structure, the blades can undesirably rub against the BOAS. This arrangement does not allow for much freedom to allow for the tip clearance to be controlled during different power settings in the engine. Thus, it is difficult to accommodate a consistent tip clearance during different power settings in the engine.

A typical full ring BOAS configuration also dictates that the power turbine case must take on a conical shape. With the addition of each stage, the corresponding ring will have a larger diameter than the previous stage, creating a conical shape, driven by the assembly process. This is due to the fact that each ring must be related to the case through lugs, meaning each stage's full ring BOAS must pass under the aft stage's lugs during assembly.

SUMMARY

In one exemplary embodiment, a gas turbine engine sealing system includes a case including forward and aft hooks. The aft hook arranged radially outward of the forward hook. A blade outer air seal has a J-hook that receives the aft hook and includes an end received by the forward hook.

In a further embodiment of any of the above, there are first and second stator vanes. Each stator vane has a forward and aft rail. The blade outer air seal includes forward and aft seals respectively secured to the end and the J-hook. The aft seal engages the forward rail of the second stator vane.

In a further embodiment of any of the above, the forward seal is U-shaped and receives the forward hook.

In a further embodiment of any of the above, the forward hook includes a groove. A piston seal is received in the groove and extends radially inward to engage the forward seal and bias the end radially inward into engagement with the forward hook.

In a further embodiment of any of the above, the aft rail of the first stator vane abuts the piston seal.

In a further embodiment of any of the above, the forward hook provides a tab. The blade outer air seal includes a notch that receives the tab and circumferentially locates the blade outer air seal relative to the case.

In a further embodiment of any of the above, the aft seal is L-shaped and includes a radially inwardly extending flange that engages the forward rail of the second stator vane.

In a further embodiment of any of the above, the forward and aft hooks open aftward.

In a further embodiment of any of the above, the sealing system includes first stage forward and aft hooks that open forward. A first stage blade outer air seal includes first and second flanges integral with a base portion that supports a blade seal. The first and second flanges respectively received by the first stage forward and aft hooks.

In a further embodiment of any of the above, the sealing system includes a mid-turbine duct. The base portion includes a groove that receives a piston seal that engages the mid-turbine duct.

In a further embodiment of any of the above, the sealing system includes a second case. A spring is arranged axially between and in engagement with the second case and the base portion of the first stage blade outer air seal.

In a further embodiment of any of the above, the aft hook at least partially overlaps the forward hook in the radially inward direction.

In a further embodiment of any of the above, the sealing system includes a circumferential array of blade outer air seals. Each blade outer air seal provides an arcuate segment that has an outer seal that circumferentially overlaps an adjacent arcuate segment in an installed position.

In a further embodiment of any of the above, the blade outer air seal includes an outer diameter side. A spring is supported on the outer diameter side and engages the aft hook to bias the blade outer air seal radially inward.

In a further embodiment of any of the above, the case is a turbine case and includes an exhaust case that is secured to the turbine case. A stator vane has a forward and aft rail. The blade outer air seal includes forward and aft seals respectively secured to the end and the J-hook. The aft seal engages the exhaust case.

In another exemplary embodiment, a blade outer air seal includes an arcuate base portion that extends from an end to a J-hook. An outer seal is supported on an outer diameter side of the base portion and extends circumferentially beyond the base portion. A blade seal is arranged on an inner diameter side of the base portion. Forward and aft seals are respectively secured to the end and the J-hook.

In a further embodiment of any of the above, a spring is supported on the outer diameter side.

In a further embodiment of any of the above, the forward seal is U-shaped and the aft seal is L-shaped.

In another exemplary embodiment, a method of installing a blade outer air seal assembly in a gas turbine engine includes inserting a blade outer air seal segment into a case.

The blade outer air seal segment is moved radially outward into a pocket arranged aftward of an aft hook. The blade outer air seal segment is slid axially forward into engagement with the aft hook and a forward hook. An outer seal of the blade outer air seal segment is arranged in a circumferentially overlapping relationship with an adjacent blade outer air seal segment.

In a further embodiment of any of the above, the gas turbine engine includes multiple stages. A first stage blade outer air seal is installed from an opposite axial direction than the blade outer air seal segment.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1:
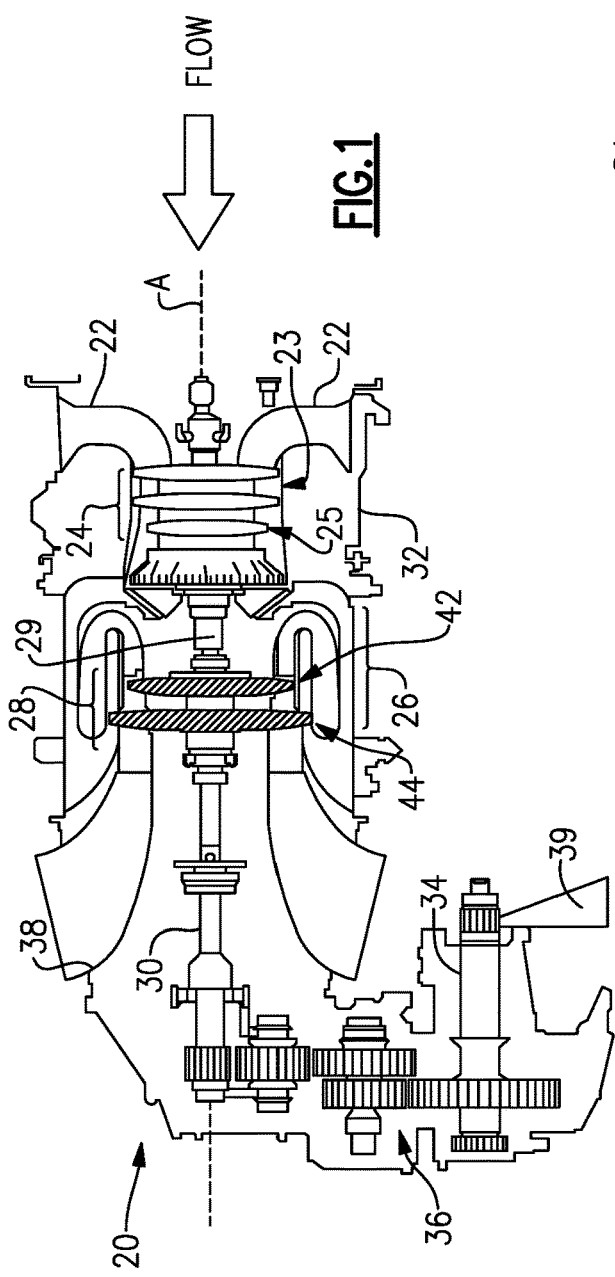
FIG. 1 is a schematic view of a gas turbine engine for use in a helicopter.

FIG. 1 schematically illustrates a gas turbine engine 20. In this example, the engine 20 is a turboshaft engine, such as for a helicopter. The engine 20 includes an inlet duct 22, a compressor section 24, a combustor section 26, and a turbine section 28.

The compressor section 24 is an axial compressor and includes a plurality of circumferentially-spaced blades. Similarly, the turbine section 28 includes circumferentially-spaced turbine blades. The compressor section 24 and the turbine section 28 are mounted on a main shaft 29 for rotation about an engine central longitudinal axis A relative to an engine static structure 32 via several bearing systems (not shown).

During operation, the compressor section 24 draws air through the inlet duct 22. Although gas turbine engines ingest some amount of dust, such engines are typically not designed for highly dusty environments. Engines such as the engine 20 are subject to operating in highly dusty environments during takeoff and landing. In this example, the inlet duct 22 opens radially relative to the central longitudinal axis A. The compressor section 24 compresses the air, and the compressed air is then mixed with fuel and burned in the combustor section 26 to form a high pressure, hot gas stream. The hot gas stream is expanded in the turbine section 28, which may include first and second turbine 42, 44. The first turbine 42 rotationally drives the compressor section 24 via a main shaft 29. The second turbine 44, which is a power turbine in the example embodiment, rotationally drives a power shaft 30, gearbox 36, and output shaft 34. The output shaft 34 rotationally drives the helicopter rotor blades 39 used to generate lift for the helicopter. The hot gas stream is expelled through an exhaust 38.

Figure 6C:
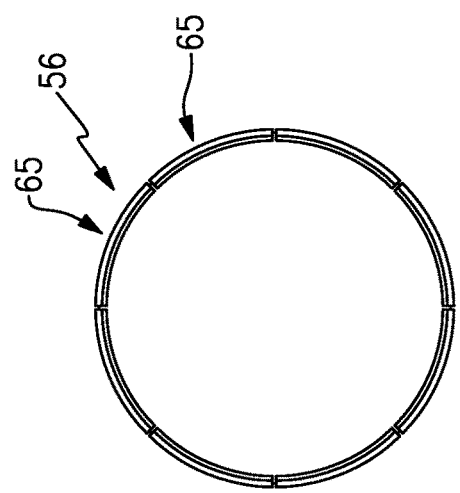
FIGS. 6A-6C respectively illustrate a single blade outer air seal segment, an array of blade outer air seal segments configured for insertion into a turbine case, and the array of blade outer air seals installed in the turbine case.
Figure 6B:
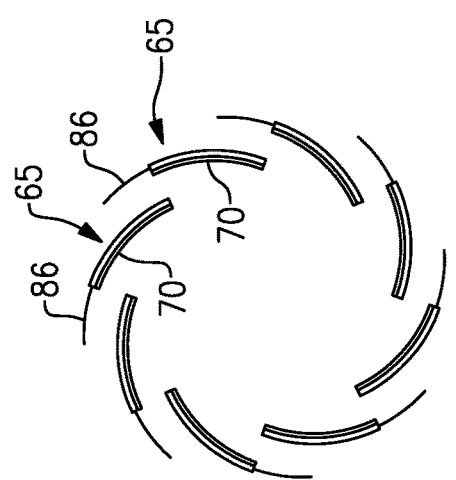
Figure 6A:
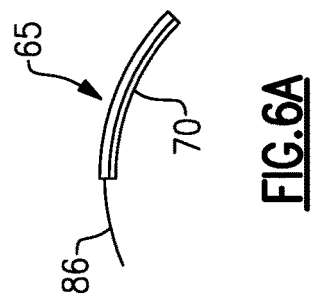

The engine 20 also includes a seal system in the turbine section 28 around the blades. Such a seal system may be referred to as a blade outer air seal (BOAS) assembly 56, which is provided by an array of BOAS segments (or "BOAS") 65, as best shown in FIG. 6A-6C. The seal system serves to provide a minimum clearance around the tips of the blades, to limit the amount of air that escapes around the tips.

Figure 2:
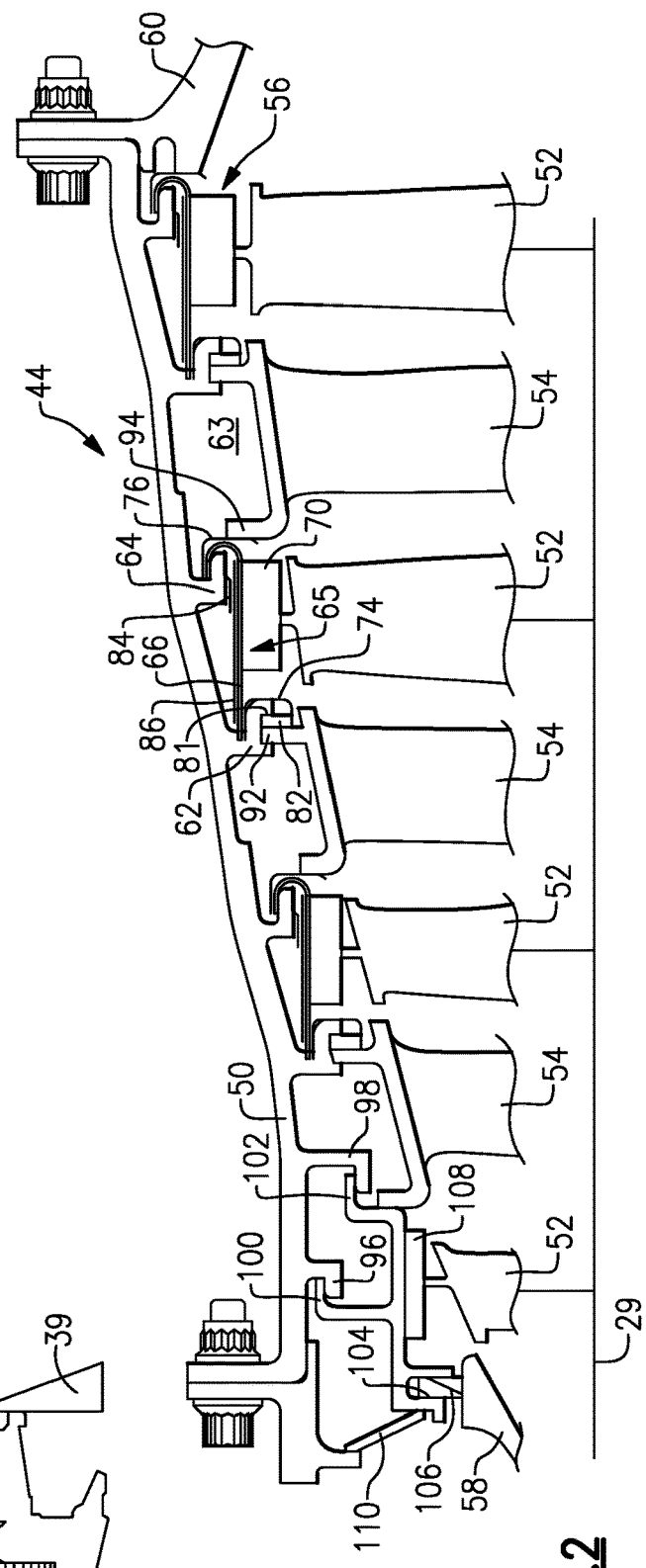
FIG. 2 is a schematic cross-sectional view through a power turbine of the gas turbine engine shown in FIG. 1.

The power turbine 44 is shown in more detail in FIG. 2. The power turbine 44 includes stages of stator vanes 54 axially spaced apart from one another and supported with respect to the turbine case 50, which is part of the engine static structure 32. Stages of rotor blades 52 are axially interspersed between the stages of stator vanes 54. Another case, such as a high pressure turbine case or a mid-turbine case, is secured to the front of the turbine case 50. A mid-turbine duct 58 feeds core flow gases from the high pressure turbine to the power turbine 44. An exhaust case 60 is secured to the aft of the turbine case 50.

The turbine case 50 includes sets of circumferentially spaced hooks that axially spaced from one another to support the BOAS 65. Each BOAS array includes forward and aft hooks 62, 64, which open aftward. The aft hook 64 is radially outward of the forward hook 62 such that the aft hook 64 at least partially overlaps obstructs the forward hook 62 in the radially inward direction. Throughout this disclosure the terms "forward" and "aft" are used to indicate position and orientation with respect to the engine 20. That is, "forward" is nearer the core inlet, and "aft" is nearer the core exhaust. However, it should be understood that "forward" and "aft" may be reversed, if desired.

Figure 3:
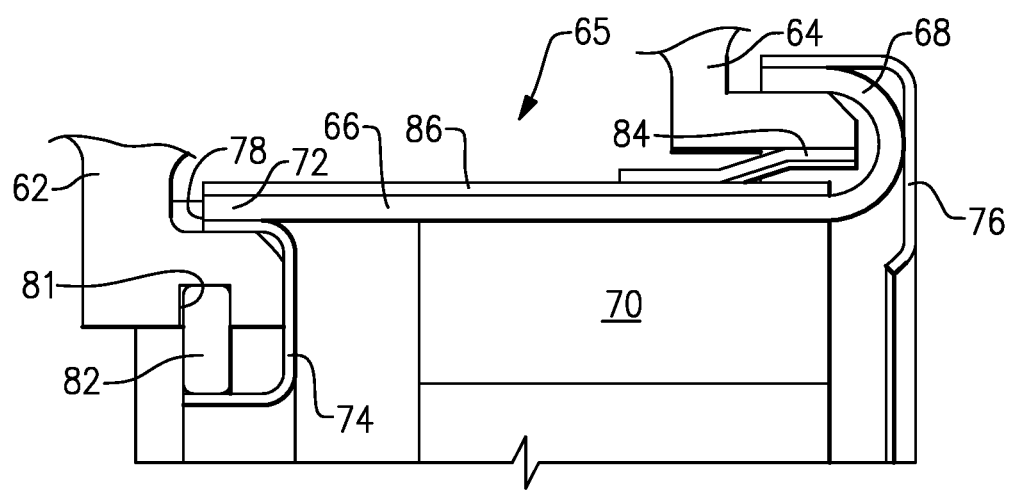
FIG. 3 is a cross-sectional view of a blade outer air seal shown in FIG. 2.
Figure 4:
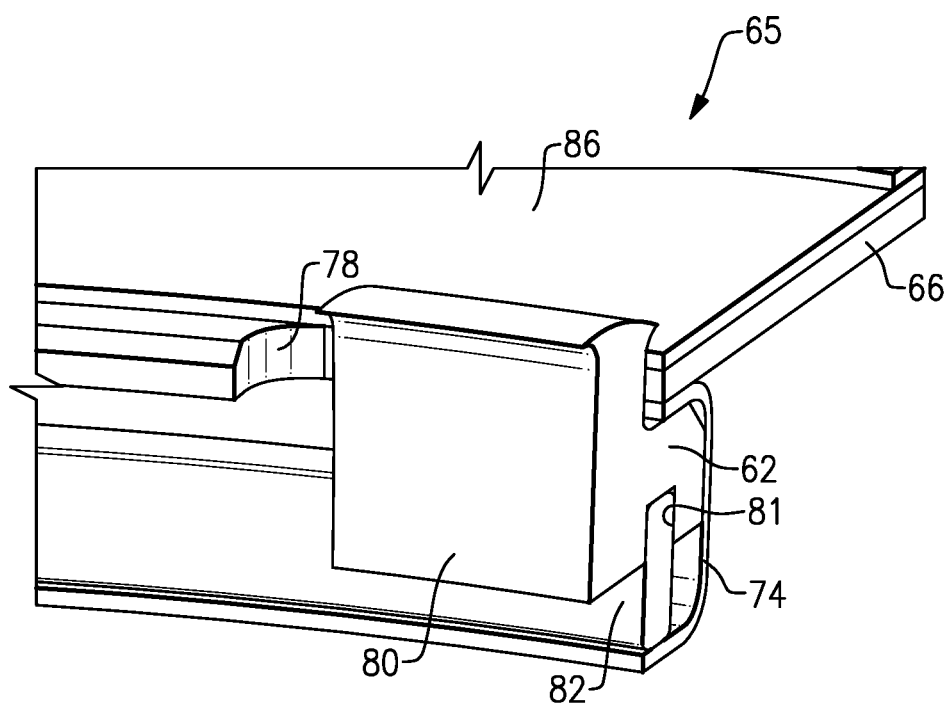
FIG. 4 is a partial perspective cross-sectional view of the blade outer air seal shown in FIG. 3.
Figure 5:
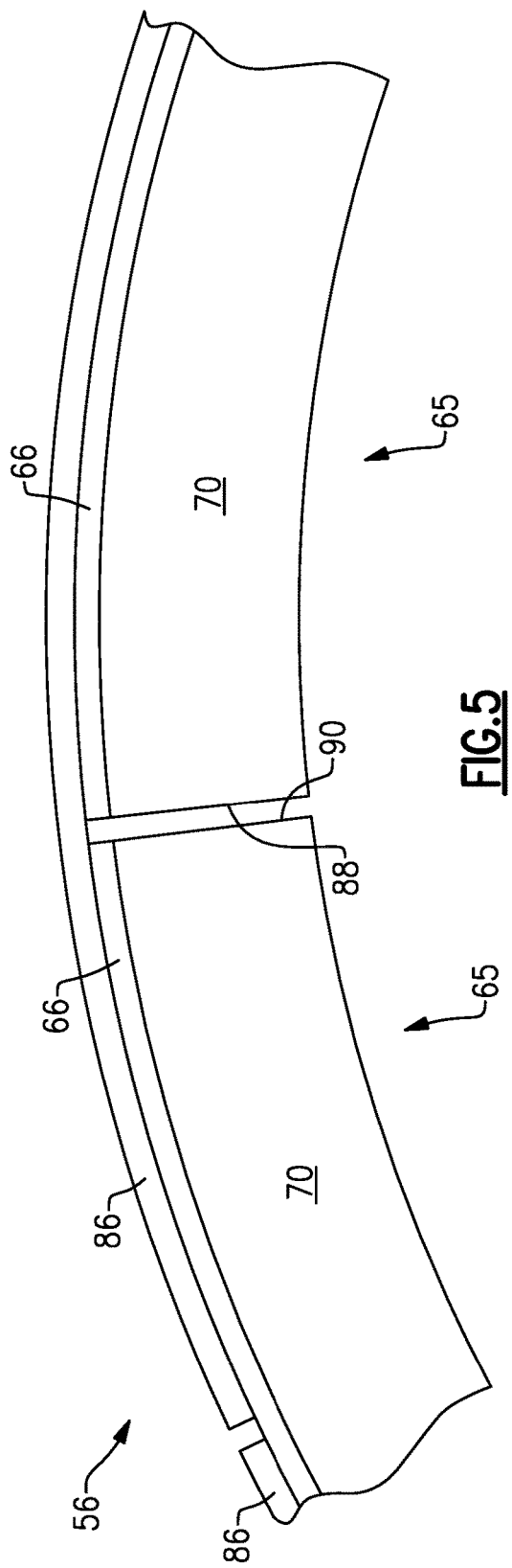
FIG. 5 is an enlarged cross-sectional view taken circumferentially through a pair of adjacent blade outer air seal segments.

Referring to FIGS. 3 and 4, each BOAS segment 65 has an arcuate base portion 66 extending from an end 72 to a J-hook 68. An outer seal 86 is supported on an outer diameter side of the base portion 66 and extends circumferentially beyond the base portion 66, as best shown if FIGS. 5 and 6A. The outer seal 86 circumferentially overlaps an adjacent BOAS 65 when in an installed position (FIGS. 5 and 6C), with first and second circumferential ends 88, 90 of adjacent BOAS arranged circumferentially adjacent to one another.

A blade seal 70, such as a honeycomb, is arranged on an inner diameter side of the base portion 66 to seal relative to the blade tip. Forward and aft seals 74, 76 are respectively secured to the end 72 and the J-hook 68. The forward seal 74 is U-shaped, and the aft seal 76 is L-shaped. A spring 84 is supported on the outer diameter side of the BOAS 65, in the example, on the outer seal 86.

Referring to FIGS. 2-4, the J-hook 68 receives the aft hook 64, and the end 72 is received by the forward hook 62. The forward hook 62 provides a tab 80, and the base portion 66 of the BOAS 65 includes a notch 78 that receives the tab 80 and circumferentially locates the BOAS 65 relative to the turbine case 50.

The forward seal 74 receives the forward hook 62. The forward hook 62 includes a groove 81, and a piston seal 82 is received in the groove 81 and extends radially inward to engage the forward seal 74 and bias the end 72 radially inward into engagement with the forward hook 62. An aft rail 92 of the stator vane forward of the BOAS 65 abuts the piston seal 82.

The spring 84 is supported on the outer diameter side of the BOAS 65 and engages the aft hook 64 to bias the BOAS 65 radially inward. The aft seal 76 includes a radially inwardly extending flange that engages a forward rail 94 of the stator vane aft of the BOAS 65. For the last stage of stator vanes, the aft seal 76 of the BAOS 65 engages the exhaust case 60.

In the example, the BOAS in the first stage attaches forward and aft hooks 96, 98 that open forward, in the direction opposite the second through fourth stage BOAS. The first stage a first stage BOAS is different than the BOAS 65 used in the remaining stages. The first stage BOAS includes first and second flanges 100, 102 integral with its base portion that supports the blade seal, or honeycomb, 108, the first and second flanges respectively received by the first stage forward and aft hooks. The base portion includes a groove 104 that receives a piston seal 106 that engages the mid-turbine duct 58. A spring 110 is arranged axially between and in engagement with the forward case and the base portion of the first stage BOAS, which biases the first stage BOAS aftward against the first stage stator vane.

In operation, the BOAS array is installed into the turbine case 50 by inserting a BOAS segment 65 into the turbine case. The BOAS 65 is moved radially outward into a pocket 63 arranged aftward of an aft hook 64 and radially outward of the where the stator vanes will be installed. The BOAS 65 are slid axially forward into engagement with the forward and aft hooks 62, 64. The BOAS 65 in the array 56 are arranged in circumferentially overlapping relationship with an adjacent BOAS 65. The first stage BOAS is installed from an opposite axial direction than the BOAS 65 used in stages two through four.

The disclosed BOAS configuration uses circumferential segments instead of a full ring arrangement. The BOAS segments also feature hooks which connect the segments to the inside diameter of the power turbine case. The BOAS segments may be constructed from a cast nickel material, the honeycomb may be constructed from nickel sheet metal. The BOAS segments are not constrained in the radial direction so they are free to expand as they are heated. This allows for the location of the BOAS to be controlled by the temperature of the power turbine case, which is much more consistent.

By controlling the location of the BOAS with the case the power turbine will have much more consistent tip clearance at higher engine power settings. As the temperature of the power turbine case is much lower than a ring BOAS segment there is less sensitivity to temperature, this results in more control in the tip clearance between the blade tip and honeycomb.

With a segmented design each segment can be loaded separately and assembled into a full ring inside of the case. This allows for the design of the BOAS to be driven by the flow path rather than assembly constraints, ultimately reducing the diameter and weight of the power turbine case. When compared to a full ring BOAS configuration, the segmented BOAS configuration would show the largest weight saving benefit as the number of stages increases and/or as the flow path takes on a more cylindrical shape.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine sealing system, comprising:
    a case including a forward and an aft hook, the aft hook arranged radially outward of the forward hook;
    a blade outer air seal having a J-hook receiving the aft hook and including an end received by the forward hook;
    first and second stator vanes, each stator vane having a forward and aft rail, the blade outer air seal includes a forward and an aft seal respectively secured to the end and the J-hook, the aft seal engaging the forward rail of the second stator vane, wherein the forward seal is U-shaped and receives the forward hook, wherein the forward hook includes a groove; and
    a piston seal is received in the groove and extends radially inward to engage the forward seal and bias the end radially inward into engagement with the forward hook, wherein the aft rail of the first stator vane abuts the piston seal.

2. The sealing system of claim 1, wherein the forward hook provides a tab, and the blade outer air seal includes a notch that receives the tab and circumferentially locates the blade outer air seal relative to the case.

3. The sealing system of claim 1, wherein the aft seal is L-shaped and includes a radially inwardly extending flange that engages the forward rail of the second stator vane.

4. The sealing system of claim 1, wherein the forward and aft hooks open aftward.

5. The sealing system of claim 4, comprising first stage forward and aft hooks that open forward, a first stage blade outer air seal that includes first and second flanges integral with a base portion that supports a blade seal, the first and second flanges respectively received by the first stage forward and aft hooks.

6. The sealing system of claim 4, wherein the aft hook at least partially overlaps the forward hook in the radially inward direction.

7. The sealing system of claim 6, comprising a circumferential array of the blade outer air seals, each of the blade outer air seals providing an arcuate segment having an outer seal that circumferentially overlaps an adjacent arcuate segment in an installed position.

8. The sealing system of claim 1, wherein the blade outer air seal includes an outer diameter side, and a spring is supported on the outer diameter side and engages the aft hook to bias the blade outer air seal radially inward.

9. The sealing system of claim 1, wherein the case is a turbine case, and comprising an exhaust case secured to the turbine case.

10. The sealing system of claim 1, wherein the blade outer air seal includes:
    an arcuate base portion extending from an end to the J-hook;

an outer seal supported on an outer diameter side of the base portion and extending circumferentially beyond the base portion; and a blade seal arranged on an inner diameter side of the base portion.

11. The sealing system of claim 10, comprising a spring is supported on the outer diameter side.

12. The sealing system of claim 10, wherein the forward seal is U-shaped and the aft seal is L-shaped.

13. A gas turbine engine sealing system, comprising:
a case including a case forward and a case aft hook, the case aft hook arranged radially outward of the case forward hook, wherein the case forward and aft hooks open aftward;
a blade outer air seal having a J-hook receiving the case aft hook and including an end received by the case forward hook;
first and second stator vanes, each stator vane having a forward and aft rail, the blade outer air seal includes a forward and an aft seal respectively secured to the end and the J-hook, the aft seal engaging the forward rail of the second stator vane;
first stage forward and aft hooks that open forward, a first stage blade outer air seal that includes first and second flanges integral with a base portion that supports a blade seal, the first and second flanges respectively received by the first stage forward and aft hooks; and
a mid-turbine duct, wherein the base portion includes a groove that receives a piston seal that engages the mid-turbine duct.

14. A gas turbine engine sealing system, comprising:
a first a case forward and a case aft hook, the first case aft hook arranged radially outward of the case forward hook, wherein the case forward and aft hooks open aftward;
a blade outer air seal having a J-hook receiving the case aft hook and including an end received by the case forward hook;
first and second stator vanes, each stator vane having a forward and aft rail, the blade outer air seal includes a forward and an aft seal respectively secured to the end and the J-hook, the aft seal engaging the forward rail of the second stator vane;
first stage forward and aft hooks that open forward, a first stage blade outer air seal that includes first and second flanges integral with a base portion that supports a blade seal, the first and second flanges respectively received by the first stage forward and aft hooks; and
a second case, and a spring is arranged axially between and in engagement with the second case and the base portion of the first stage blade outer air seal.

15. A method of installing a blade outer air seal assembly in a gas turbine engine, the method comprising:
inserting aft blade outer air seal segment into a case;
moving the blade outer air seal segment radially outward into a pocket arranged aftward of an aft hook;
sliding the blade outer air seal segment axially forward into engagement with the aft hook and a forward hook; and
arranging an outer seal of the blade outer air seal segment in circumferentially overlapping relationship with an adjacent blade outer air seal segment.

16. The method of claim 15, wherein the gas turbine engine includes multiple stages including a first stage, wherein a first stage blade outer air seal is installed from an opposite axial direction than the blade outer air seal segment.

* * * * *